United States Patent [19]

Fischer et al.

[11] 4,120,369

[45] Oct. 17, 1978

[54] METHOD FOR DRILLING A WELL THROUGH UNCONSOLIDATED DOLOMITE FORMATIONS

[75] Inventors: Paul W. Fischer, Whittier; David S. Pye, Brea; Julius P. Gallus, Anaheim, all of Calif.

[73] Assignee: Union Oil Company of California, Brea, Calif.

[21] Appl. No.: 838,895

[22] Filed: Oct. 3, 1977

[51] Int. Cl.² .......................................... E21B 33/138
[52] U.S. Cl. ................................. 175/72; 166/292
[58] Field of Search ................. 166/285, 292, 294; 175/57, 65, 66, 72; 252/8.5 LC

[56] References Cited

U.S. PATENT DOCUMENTS

| | | | |
|---|---|---|---|
| 2,207,759 | 7/1940 | Reimers | 166/292 |
| 2,252,669 | 8/1941 | Cross et al. | 175/72 X |
| 3,149,684 | 9/1964 | Eckel et al. | 166/292 X |
| 3,175,611 | 3/1965 | Hower | 166/292 |
| 3,259,189 | 7/1966 | Darley | 166/292 |
| 3,291,214 | 12/1966 | Hower | 166/292 X |
| 3,396,790 | 8/1968 | Eaton | 166/300 X |
| 3,461,980 | 8/1969 | Kelly, Jr. | 166/292 X |
| 3,530,937 | 9/1970 | Bernard | 166/292 X |
| 3,592,267 | 7/1971 | Stainback et al. | 166/294 |
| 3,593,796 | 7/1971 | Stainback et al. | 166/292 X |
| 3,692,125 | 9/1972 | Ruhle | 175/72 X |
| 3,965,986 | 6/1976 | Christopher | 166/292 |
| 4,031,958 | 6/1977 | Sandiford et al. | 166/292 X |

*Primary Examiner*—Stephen J. Novosad
*Assistant Examiner*—George A. Suchfield
*Attorney, Agent, or Firm*—Richard C. Hartman; Dean Sandford; Daniel R. Farrell

[57] ABSTRACT

A method for drilling a well through a subterranean formation containing one or more zones of unconsolidated dolomite, wherein the drilling operation is interrupted periodically to consolidate the newly drilled incompetent dolomite by the injection of a sequence of reactant slugs comprised of (I) an aqueous solution containing an acid, a surface active agent and a precipitating agent for silicates, (II) an aqueous solution containing a water-soluble silicate, and (III) an aqueous solution containing a precipitating agent for silicates.

18 Claims, 11 Drawing Figures

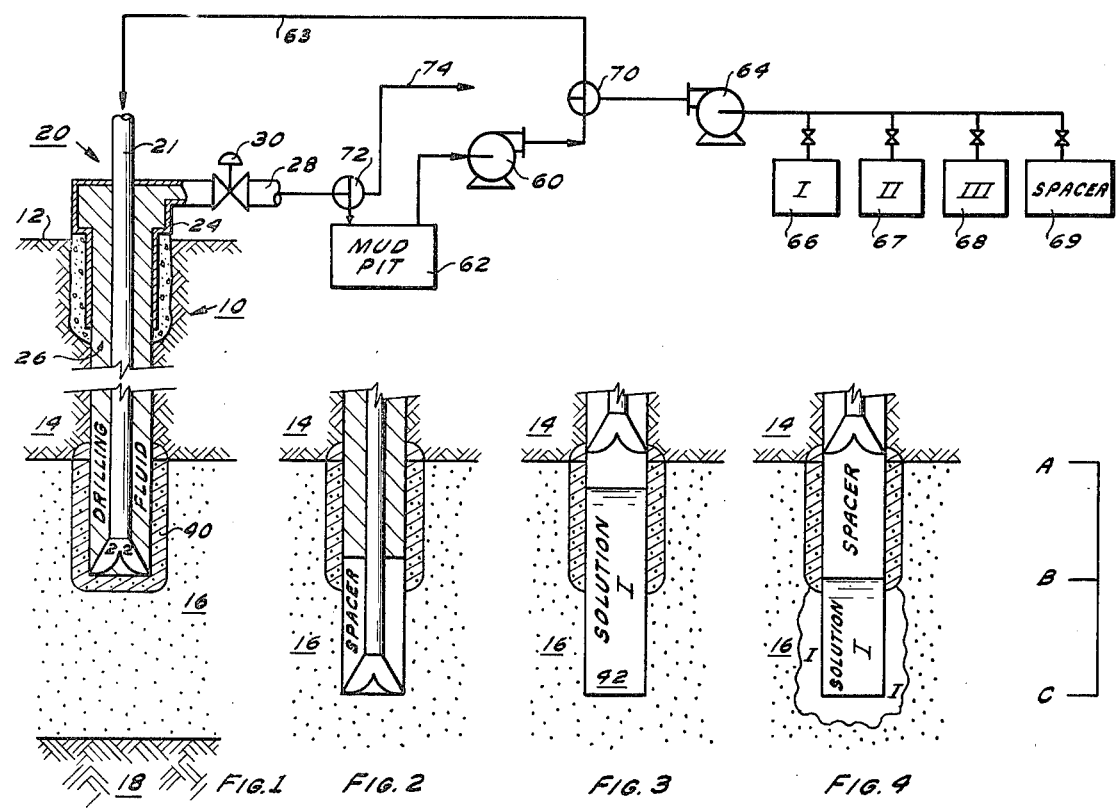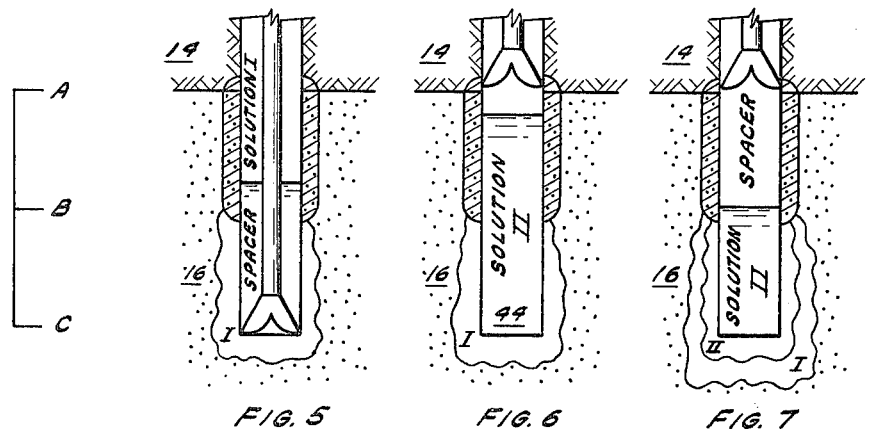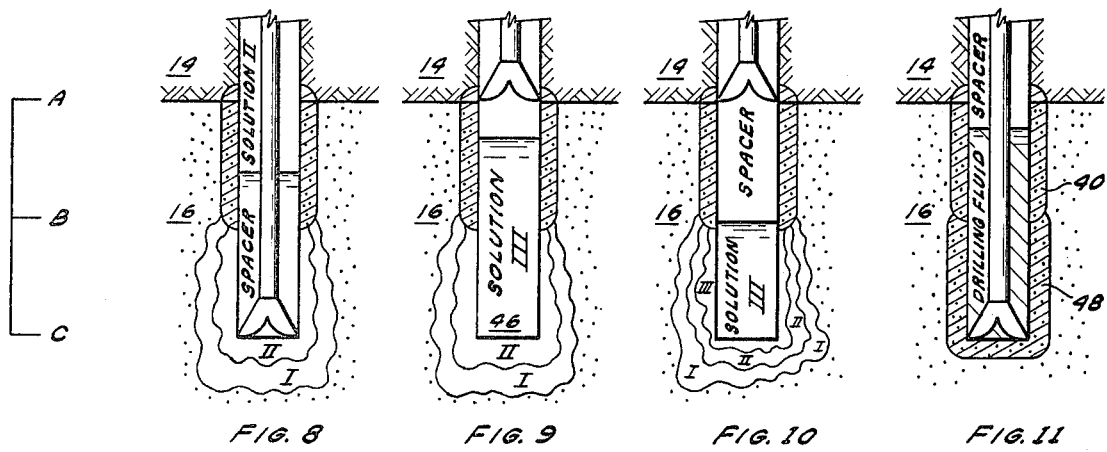

METHOD FOR DRILLING A WELL THROUGH UNCONSOLIDATED DOLOMITE FORMATIONS

BACKGROUND OF THE INVENTION

1. Field of the Invention

This invention relates to the drilling of wells, and more particularly concerns an improved method for drilling a well through a formation containing unconsolidated dolomite.

2. Description of the Prior Art

Drilling a well through an incompetent subterranean formation has presented many problems. Conventionally, aqueous-base drilling fluids containing water, clay and various additives are circulated through the bore hole during the drilling operation to carry drill cuttings from the bore hole to the surface. These clay-containing drilling fluids form a mud cake on the bore hole walls which reduces the sloughing of the incompetent formation as long as the fluid pressure in the bore hole due to the standing column of drilling fluid, exceeds the pressure of the connate fluid in the incompetent formation. Therefore, drilling through typical incompetent formations per se is not particularly a problem. However, it is commonplace to encounter a lost circulation zone, either in the incompetent formation itself or in an underlying strata, or to lose the column of drilling fluid due to the cumulative effect of individually manageable fluid losses to a plurality of formations. When the lost circulation results in a fluid pressure in the bore hole less than the fluid pressure in the adjacent incompetent formation, the formation will slough into the bore hole. A stuck drill string often results from this sloughing and may lead to abandonment of the drill string and the well.

The incompetent formations normally encountered in drilling oil and gas wells are generally formations which contain quartz sand and/or clay. Accordingly, the prior art methods of consolidating these formations have been directed to injecting one or more chemical solutions to react with the quartz sand or clay to form a consolidated sheath about the well bore. Depending upon whether or not it is desirable to permanently seal the formation from the well bore, the chemical solutions can be selected such that the resulting sheath is either permeable, such as disclosed in U.S. Pat. No. 3,175,611 to Hower, or substantially impermeable, such as disclosed in U.S. Pat. No. b 2,207,759 to Reimers.

Dolomite formations encountered in drilling oil and gas wells are generally competent unless the formation also contains a significant amount of quartz sand or clay. Accordingly, dolomite formations which are substantially free of quartz sand and clay have not required consolidation. However, subterranean formations containing one or more zones of unconsolidated dolomite have been encountered in drilling core holes for minerals exploration, and in drilling wells to explore geothermal prospects. The incompetent dolomite is believed to result when a zone of dolomite crystals dispersed in a calcite matrix is subjected to ground water leaching, such as hydrothermal leaching by a geothermal fluid. The ground water selectively leaches the more soluble calcite matrix materials to leave the unconsolidated, finely divided dolomite crystals. These crystals are relatively free flowing and are prone to sloughing into a void space, such as a bore hole.

Previous attempts to drill through these unconsolidated dolomite formations have been unsuccessful. Numerous core holes and at least one well drilled to explore a geothermal prospect have been abandoned due to this problem. Prior art consolidation methods have been found to be inadequate for the consolidation of the incompetent dolomite formations. Therefore, a need exists for a method for drilling through incompetent dolomite formations.

Accordingly, a principal object of this invention is to provide a method for drilling a well through incompetent dolomite formations.

Another object of this invention is to provide a method for drilling through a hydrothermally-leached formation containing incompetent dolomite.

Yet another object of the invention is to provide a method for consolidating an incompetent dolomite formation during the drilling operation sufficiently to prevent subsequent sloughing of the formation into the bore hole during the drilling operation.

A further object of the invention is to provide an improved drilling method by which a relatively thick incompetent zone of dolomite can be penetrated while avoiding sloughing of the dolomite into the bore hole and while reducing fluid loss to the incompetent formation.

Further objects, advantages and features of the invention will become apparent to those skilled in the art from the following description taken in conjunction with the accompanying drawings.

SUMMARY OF THE INVENTION

The invention provides a method for drilling a well through an incompetent dolomite formation. In the method, the drilling operation is periodically suspended after penetrating a distance into the incompetent formation and the portion of the newly drilled formation adjacent the bore hole is consolidated by the injection of a sequence of discrete slugs comprised of (I) an aqueous solution containing an acid, a surface active agent and a precipitating agent for silicates, (II) an aqueous solution containing a water-soluble silicate capable of reacting with solution I to form a silicate gel, and (III) an aqueous solution of a precipitating agent for silicates. Solutions I, II and III react in the newly drilled portion of the formation to form and set a silicate gel thereby forming a substantially impermeable, consolidated sheath around the bore hole. This sheath serves to prevent sloughing of the incompetent formation during the later stages of the drilling operation and until the well can be completed.

In a preferred embodiment of the method of this invention, formations which contain one or more zones of the incompetent dolomite are drilled by conventional rotary drilling techniques using an aqueous, substantially clay-and oil-free drilling fluid. The well is drilled in a plurality of increments and each newly drilled portion of the formation is consolidated by the aforementioned treatment prior to drilling the next increment.

The invention provides the important advantage of consolidating each portion of the formation as it is encountered, thereby avoiding the possibility of a stuck drill string due to subsequent sloughing of the formation. The consolidation also substantially eliminates fluid loss to the formation adjacent the consolidated annular sheath. Furthermore, the consolidation treatment can be and is preferably conducted without pulling the drill string from the hole and the method does not require the use of a well liner or any special tools.

BRIEF DESCRIPTION OF THE DRAWINGS

The invention will be more readily understood by reference to the drawings wherein like numerals refer to like elements, in which:

FIGS. 1 through 11 are schematic diagrams of a cross section of earth strata which illustrate the series of steps carried out in a preferred embodiment of the method of this invention.

DETAILED DESCRIPTION OF THE INVENTION

The method of this invention is applicable to all drilling operations in which incompetent dolomite formations are to be penetrated, such as core drilling for minerals exploration, rotary drilling in the exploration for oil, gas or a geothermal fluid or in the drilling of wells or shafts to gain access to a subterranean formation. The method of this invention finds particular utility in the rotary drilling of a well through an incompetent dolomite formation overlying a geothermal reservoir.

A preferred embodiment of the method of this invention is illustrated in FIGS. 1 through 11. As shown in FIG. 1, well 10 extends from the earth surface 12 through a first subterranean formation 14 and a short distance (from point A to point B) into a second subterranean formation 16. Formation 14 is fairly competent and therefore does not require consolidation. Formation 16, however, contains unconsolidated dolomite which is prone to sloughing into the bore hole. Below formation 16 is a fluid-bearing reservoir 18 such as a reservoir containing oil, gas, steam or high temperature brine, or other mineral deposits of interest. The objective of the rotary drilling operation is to penetrate into formation 18 to tap the fluid contained therein or to obtain core samples of the mineral deposits.

A drill string, shown generally as 20, is disposed in well 10 in a conventional manner. Drill string 20 includes rigid conduit 21 and drill bit 22 attached to the end of conduit 21. Well casing 24 is disposed in the top of well 10 in a conventional manner to seal off the top strata of formation 14 from the bore hole and to provide a fluid tight pathway from well 10 to blooie line 28. During the drilling operation, drill string 20 is rotated by a prime mover, not shown, and a drilling fluid is circulated by pump 60 from mud pit 62 through line 63, downwardly through drill string 20, upwardly through well annulus 26 and out through blooie line 28 back to mud pit 62. Valve 30 is provided on blooie line 28 to shut in well annulus 26. The circulating drilling fluid carries drill cuttings from the bore hole to mud pit 62.

Chemical injection pump 64 is provided to inject reactant solutions from tanks 66, 67 and 68, and spacer liquid from tank 69 through line 63 and into well 10. Three-way valves 70 and 72 are provided to switch from the drilling fluid circulating system to the chemical injection system. Tank 66 contains solution I which is an aqueous solution of an acid, a surface active agent and a water-soluble precipitating agent. Tank 67 contains solution II which is an aqueous solution of a water-soluble silicate. Tank 68 contains solution III which is an aqueous solution of a water-soluble precipitating agent. And tank 69 contains a spacer liquid which is substantially nonreactive with respect to solutions I, II and III and the drilling fluid. Three-way valve 72 is provided on blooie line 28 to direct any excess of solution I, II and III to a disposal site, not shown, through conduit 74. Preferably the excess reactant slugs are not dumped into mud pit 62 in order to avoid contamination of the drilling fluid.

FIG. 1 illustrates the status of well 10 after the bore hole has been drilled from point A to point B into formation 16 and the newly drilled portion of the formation has been consolidated in accordance with the method described more fully hereinafter. During this consolidation a substantially impermeable sheath, shown generally as 40, was formed around the bore hole, which sheath prevents sloughing of the formation into well 10.

In the method, the bore hole is extended from point B to point C into formation 16 in the conventional manner, i.e., by rotating drill string 20 and circulating a drilling fluid downwardly through conduit 21 and upwardly through annulus 26. Upon reaching point C, the drilling operation is interrupted and the newly drilled portion of formation 16, i.e., from point B to point C, is consolidated by the sequence of steps illustrated in FIGS. 2 through 11. In these steps, a body of each reactant solution is first positioned in the bottom of the bore hole by slowly raising the drill string as the reactant solution is flowed into the well. This raising of the drill string reduces the mixing of the reactant solution with the other fluids in the well and also minimizes the time during which the drill string is immersed in the reactant solution. This latter feature greatly reduces the chances that the drill string will become stuck in the well by premature cementation of the reactant solutions. Next, the well annulus is sealed by one of the methods well known in the art and a spacer slug is injected under pressure to displace the reactant solution into the newly drilled portion of the formation. Although the incompetent formations are normally porous and often drain fluid continuously from the bore hole, the reactant solutions are injected under pressure to ensure placement of a sufficient quantity of the solutions in the formation to form a sizable consolidated sheath. Furthermore, the permeability of the formation is significantly reduced by the injection of solutions I and II, therefore solution III must be displaced into the formation under pressure. Typically, the permeability of the consolidated sheath will be on the order of less than one thousandth of the permeability of the unconsolidated formation.

As shown in FIG. 2, the drilling fluid is displaced upwardly through well annulus 26 by injecting a spacer liquid through conduit 21 while drill string 20 is rested on the bottom of the well. Then, drill string 20 is raised as a discrete slug of solution I is introduced through conduit 21 into the bore hole to provide body 42 of solution I in the bottom of well 10, as shown in FIG. 3. Next, annulus 26 is shut in by means of valve 30 or any other conventional device, such as an expandable packer, not shown, positioned on drill string 20. A spacer liquid is injected under pressure into well 10 through conduit 21 to displace solution I into the newly drilled portion of formation 16, as shown in FIG. 4. The pressure in well 10 is then reduced by opening valve 30; drill string 20 is run to the bottom of well 10; and the excess solution I is displaced out of annulus 26 by a spacer, as shown in FIG. 5.

Solutions II and III are each introduced into the bottom of well 10 and displaced into the newly drilled portion of formation 16 by the same method as described above for the injection of solution I. Briefly, FIG. 6 illustrates body 44 of solution II in the bottom of the bore hole, which was formed by the injection of a discrete slug of solution II through conduit 21 as drill string 20 was raised; FIG. 7 illustrates the displacement of solution II into the newly drilled portion of formation 16 by a spacer liquid which was injected into the shut-in well under pressure; FIG. 8 illustrates the displacement of the excess solution II upwardly through the well annulus by a spacer; FIG. 9 illustrates body 46 of solution III in the bottom of the bore hole, which was formed by the injection of a discrete slug of solution III through conduit 21 as drill string 20 was raised; and FIG. 10 illustrates the displacement of solution III into the newly drilled portion of formation 16 by a spacer fluid which was injected into the shut-in well under pressure.

It is preferred that the amount of mixing of the reactant solutions with other fluids in the well bore, i.e., connate fluids and spacer slugs, be minimized and that the amount of spacer actually displaced into the formation between the reactant solutions be minimized, in order that the reactant solutions become well mixed at the highest possible concentration of reactant chemicals. Accordingly, it is preferred that the slugs of reactant solutions and spacer be sized such that the excess solution remaining in the bore hole after displacement by the spacer completely fills the bore hole adjacent the newly drilled portion of the formation as illustrated in FIGS. 4, 7 and 10. This procedure reduces the amount of spacer displaced into the formation to the small amount due to the natural fluid loss during the displacement of the excess solution from the bore hole illustrated in FIGS. 5 and 8.

As shown in FIG. 10, a portion of each discrete slug of solutions I, II and III has been displaced into formation 16. Although shown in formation 16 as distinct fluids, it will be understood of course that the three solutions will mix in formation 16 adjacent the bore hole. Solutions I, II and III interact to form a silicate gel which consolidates the formation adjacent the bore hole by forming a substantially impermeable annular sheath about the bore hole. FIG. 11 illustrates the status of well 10 after sheath 48 has set in the newly drilled portion of formation 16. Sheath 40 and sheath 48 together form a substantially continuous sheath which prevents sloughing of formation 16 into the bore hole and substantially eliminates fluid passage between the bore hole and formation 16.

The third and subsequent portions of formation 16 are drilled and treated by repeating these same steps. The formation containing incompetent dolomite will normally be drilled in a plurality of increments of from about 20 to about 100 feet in depth, preferably between about 20 and about 60 feet in depth. Once the unconsolidated formation has been passed or the fluid-bearing reservoir has been penetrated, the consolidation treatment can be suspended and conventional drilling and completion methods can be used to complete the well, such as by running a well liner or production casing and cementing it in place.

From this description of the preferred process steps, it will be apparent that numerous modifications can be made in the method of injection of the reactant solutions into the formation. For example, it is contemplated that the solutions can be injected without the raising and lowering of the drill string, and that one or more of the spacer solutions may be deleted without adversely affecting the consolidation of the formation. However, since the premature mixing of the reactant solutions or some other unforeseen problem could result in the drill string being stuck in the well, the above-described process steps are preferred in order to substantially prohibit this result.

In rotary drilling, the drilling fluid employed to drill through strata overlying the unconsolidated dolomite formation is not deemed critical, but rather will be selected according to methods well known in the art which depend in general upon the type of strata penetrated. However the selection of a drilling fluid for drilling through the unconsolidated dolomite is critical to the success of the method of this invention. Of course, in those drilling methods which do not require drilling fluids, such as cable tool drilling, none will be used.

In rotary drilling through an incompetent formation by the method of this invention, it is desirable to use a clay-free drilling fluid. Clay tends to invade the relatively porous incompetent formations and causes plugging problems. In addition, when high temperatures are encountered, a corrosion inhibitor is usually required in the drilling fluid in order to combat the corrosive effects of oxygencontaining gases or carbon dioxide in either the drilling fluid, such as an aerated drilling fluid, or in the connate fluid. However, clay tends to absorb these corrosion inhibitors so they are not available for corrosion protection. Furthermore, while clay-containing drilling fluids normally form a mud cake on the walls of the bore hole which serves to temporarily seal off incompetent formations, this mud cake is usually not adequate to prevent the subsequent sloughing of the incompetent formation when the well goes dry due to lost circulation. However, the mud cake is difficult to remove by chemical treatment and therefore effectively seals off the incompetent formation from any fluids which are injected into the bore hole to consolidate this formation. Therefore, in drilling through incompetent formations by the method of this invention, clay-containing drilling fluids and other drilling fluids which form a relatively impermeable and difficult to remove cake on the walls of the bore hole are to be avoided. To the contrary, drilling fluids which form easily removed cakes are preferred.

Similarly, oil-containing fluids are to be avoided when drilling through incompetent formations by the method of this invention. The use of oil-containing fluids often results in rendering oil-wet the formation immediately adjacent the bore hole with a resulting lower mobility to aqueous fluids. This lower mobility undesirably reduces the injectivity of the aqueous treatment solutions. It is critical to the success of the consolidation treatment that the reactant solutions I, II and III penetrate into the unconsolidated formation in an amount sufficient to consolidate a sizable sheath about the bore hole, such as an annular sheath having a differential radius of at least 3 inches and preferably at least 6 inches. In order to consolidate a sheath this large, a fairly substantial quantity of the reactant solutions must be displaced into the unconsolidated formation. Accordingly, any fluid which reduces the permeability of the formation, such as clay- or oil-containing drilling fluid, should be avoided. In particular, cakeforming conventional drilling fluid additives such as clay, lignite, lignin and lost circulation materials which form cakes which are difficult to remove should be avoided, if possible, while drilling through the sloughing dolomite formation.

Aqueous drilling fluids which are substantially free of oil and clay are preferred for use in drilling through incompetent dolomite formations. Suitable drilling fluids can consist essentially of water or a sodium chloride brine, however these fluids are often not suitable in a particular well due to a high fluid loss or low density. As is known, a water-soluble polymer can be added to increase the viscosity of the drilling fluid and to improve the fluid loss properties of the drilling fluid. While a high fluid loss is to be avoided, a very low fluid loss is also undesirable since this indicates that the formation has been rendered relatively impermeable to water. Preferably the polymer is selected to reduce the fluid loss to an acceptable level without adversely affecting the permeability of the formation to the consolidation solutions. Slightly crosslinked polymers, such as slightly-crosslinked acrylic and hydroxyethylcellulose polymers, have been found to be effective. On the other hand, heavily crosslinked heteropolysaccharides and polyacrylamide polymers have been found to detrimentally affect the consolidation treatment. Preferred polymers included the hydroxyethylcellulose polymers marketed by Hercules, Inc. under the trademark Natrasol. Particularly preferred polymers are the sodium polyacrylates marketed by American Cyanamid Company under the trademark Cypan and those polymer additives marketed by Rotary Drilling Services and X-L Laboratories under the trademark Ben-EX and by Pal-Mix under the trademark Super-X.

Conventionally, a weighting agent such as calcium carbonate is added to an aqueous based drilling fluid to adjust the fluid density and to improve fluid loss control. A calcium carbonate weighting agent marketed by Brinadd Company under the trademark Sluggit has been found to be suitable.

One suitable drilling fluid is an aqueous solution containing about 1 pound per barrel of Cypan sodium polyacrylate and about 10 pounds per barrel of Sluggit weighting agent.

Although drilling fluids which form easily removed cakes are preferred, it is contemplated that under some well conditions the only suitable drilling fluid will be a clay-containing fluid. The method of this invention can still be used to consolidate the incompetent dolomite adjacent the bore hole but appropriate steps must be taken to remove the mud cake before solutions I, II and III are introduced into the formation. It may be necessary to remove the mud cake by an acid treatment, such as a flush of hydrofluoric acid, or by means of a mechanical scraper.

Solution I is an aqueous solution containing an acid, a surface active agent and a precipitating agent for silicates. The acid is selected from the water-soluble inorganic and organic acids which form water-soluble salts with the surface active agent and the multivalent cation of the precipitating agent. Depending on the particular precipitating agent, suitable inorganic acids include hydrochloric, nitric, hydroiodic, hydrofluoric and hydrobromic acids. Suitable organic acids include formic, acetic, propionic and citric acids. Hydrochloric acid is particularly preferred. Solution I will normally contain between about 0.5 and about 20 weight percent of acid, with good results being obtained with between 1 and 10 weight percent, and particularly between 2 and 5 weight percent of acid.

The surface active agents useful in Solution I include anionic, nonionic, cationic and amphoteric agents. (cf. Detergents and Emulsifiers, 1975 Annual, John W. McCutcheon, Inc.) A wide variety of surfactants are useful, but the preferred surfactant will depend upon the type of acid and precipitating agent contained in the solution. In general, the surfactant must be soluble in an aqueous acidic solution containing multivalent cations. Accordingly, surface active sulfates and phosphates which form precipitates with multivalent cations are not suitable. Additionally, viscous soaps, such as sodium and potassium salts of processed or modified rosins, as well as other viscosity increasing agents, such as polyacrylamides, are to be avoided since these reagents adversely reduce the mobility of the solution. If the viscosity of solution I is increased, the quantity of the reactive solutions displaced into the incompetent formation will be less, thereby reducing the effectiveness of the consolidation treatment.

Surface active amines, alkyl sarcosines, n-alkyl trimethyl ammonium chlorides and sorbitan monolaurates have been found to be useful in the method of this invention. An ethylene oxide condensation product of the primary fatty amines marketed by Armak Company under the trademark Ethomeen C/15 is an example of the cationic surfactants found to be useful in this invention. Also useful are the cocoyl sarcosines marketed by Ciba-Geigy Corporation under the trademark Sarkasyl LC (anionic), the n-alkyl trimethyl ammonium chlorides marketed by Armour Industrial Chemical Company under the trademark Arquad T-50 (cationic) and the sorbitan monolaurates marketed by Atlas Chemical Industries under the trademark Tween 20 (nonionic).

The most preferred surface active agents are those surface active amines which exhibit corrosion inhibiting properties. Most corrosion inhibitors have surface active properties and, if compatible with the aqueous acid solution containing multivalent cations, are preferred for use in the method of this invention. Suitable corrosion inhibitors which can be used either alone or in addition to the afore-mentioned surfactants in Solution I include a corrosion inhibitor marketed by the Halliburton Company under the trademark HAI-75 and an amine corrosion inhibitor marketed by The Dow Chemical Company under the trademark Dowell-A-130.

Solution I will contain between about 0.005 and about 5 weight percent of the surface active agent, with good results obtained when the solution contains between 0.05 and 3 weight percent of the surface active agent, more particularly between about 0.1 and 0.5 weight percent. The concentration of the surface active agent should never be enough to cause a significant increase in the viscosity of the solution or to otherwise reduce the mobility of the solution in the dolomite formation.

The precipitating agents suitable for use in the method of the invention include the water-soluble salts of multivalent cations which react with silicates to form and set a silicate gel. Suitable multivalent cations include the alkaline earth metals, such as magnesium, calcium, strontium and barium, and certain of the transition metals, such as zinc, manganese, iron, nickel and cobalt. Iron and calcium are the preferred multivalent cations due to their availability and low cost. Suitable precipitating agents include the multivalent cation salts of inorganic acids, such as hydrochloric, hydrobromic, hydroiodic and nitric acids, and the multivalent cation salts of organic acids, such as formic, acetic, propionic and citric acids. Chloride salts are preferred due to their low cost, with iron and calcium chlorides being particularly preferred. Solution I should contain between about 1 and about 20 weight percent of the precipitating agent. Good results are obtained when the concentration of the precipitating agent is between about 2 and 10 weight percent, more particularly about 5 weight percent.

Solution I comprises an aqueous solution containing from about 0.5 to about 20 weight percent of a water-soluble acid, from about 0.005 to about 5 weight percent of a surface active agent, and from about 1 to about 20 weight percent of a water-soluble precipitating agent for silicates. Particularly preferred compositions for use as Solution I include aqueous solutions comprised of fresh water containing from about 2 to 5 weight percent hydrochloric acid, from about 2 to 10 weight percent of iron or calcium chloride, and from about 0.1 to about 0.5 weight percent of either HAI-75 corrosion inhibitor or Ethomeen C/15 surfactant or mixtures thereof.

Solution II is an aqueous solution containing a water-soluble silicate which is capable of reacting with the precipitating agent of Solution I to form and set a silicate gel. Suitable silicates include organic silicates, such as ethyl-ortho silicate, and inorganic silicates, such as the alkali metal and ammonium silicates. The alkali metal and ammonium silicates are preferred and sodium silicate is particularly preferred. Sodium silicate is a relatively complex inorganic substance, available in various grades from $Na_2SiO_3$ to $Na_2O.4SiO_2$ and any of these grades may be suitable for the purposes of the invention. A sodium silicate marketed by the Philadelphia Quartz Company as a 37% concentrate under the trade name Sodium "N" Silicate is particularly preferred. The concentration of the silicate in Solution II should be at least about 7 weight percent. The concentration of silicate should not however be so large as to render Solution II difficult to pump.

Preferably, Solution II comprises an aqueous solution containing between about 5 and about 40 percent of an alkali metal or ammonium silicate. One suitable silicate solution is made by diluting the sodium "N" silicate concentrate in a one to one ratio with fresh water to yield a 18.5 weight percent solution of sodium silicate.

Solution III is an aqueous solution containing a precipitating agent for silicates. The precipitating agents disclosed above as a constituent of Solution I are also preferred for use in Solution III, and the precipitating agents employed in these solutions can be the same or different precipitating agents selected from the aforementioned precipitating agents. Iron and calcium chlorides are preferred precipitating agents. Solution III should contain between about 1 and 20 weight percent of the precipitating agent, with good results being obtained when the concentration of the precipitating agent is between 2 and 10 weight percent, particularly about 5 weight percent.

The spacer liquid is an aqueous solution which is non-reactive with the drilling fluid and solutions I, II and III. Suitable liquids include fresh water and dilute solutions of alkali metal and ammonium salts, such as a 3 weight percent solution of NaCl.

Solutions I, II and III, and the spacer liquid should be substantially oil-free. Any oil injected into the unconsolidated formation will adversely affect the consolidation treatment by reducing the quantity of reactive solutions injected and by causing the consolidated sheath to be more permeable.

The volumes of the reactant solutions employed to consolidate each newly drilled portion of the incompetent formation will depend, of course, on the diameter of the bore hole, the concentrations of reactants used, the length of the newly drilled portion of the bore hole, and the desired thickness of the consolidated annular sheath. Although the volumes can vary widely, the following volumes are presented as exemplary for the treatment of 30 feet of newly drilled formation for the indicated size of bore hole by the method illustrated in FIGS. 1–11.

| Treatment Slug | Composition | Volume of Treatment Slug, Gal. | |
|---|---|---|---|
| | | Bore Diam. 8.5-inch | Bore Diam. 12-inch |
| 1) Spacer | 3% NaCl | 140 | 320 |
| 2) Solution I | 5% $CaCl_2$ 2% HCl 0.2% HAI-75 | 200 | 370 |
| 3) Spacer | 3% NaCl | 100[a] 230[b] | 180[a] 370[b] |
| 4) Solution II | 18.5% $Na_2SiO_3$ | 200 | 370 |
| 5) Spacer | 3% NaCl | 100[a] 230[b] | 180[a] 530[b] |
| 6) Solution III | 5% $CaCl_2$ | 200 | 370 |
| 7) Spacer | 3% NaCl | 100[a] 140[b] | 180[a] 320[b] |

[a] Spacer injected under pressure to displace a like volume of reactant solution into the formation.
[b] Spacer introduced to displace excess reactant solution from the bore hole.

The suitability of a particular combination of reactant solutions for consolidating incompetent dolomite can be determined by a Dolomite Consolidation Procedure, as follows:

Dolomite crystals from a hydrothermally-leached formation are placed into a 1.5-inch glass tube on a wire screen supported by a rubber stopper, so as to form a loosely packed, 1-inch thick cake on the screen. The rubber stopper is provided with a ¼-inch tubing which provides fluid tight communication between the glass tube and a vacuum flask.

The dolomite cake is saturated with a 3 weight percent sodium chloride solution and then sequentially contacted with each of solutions I, II, III by placing 40 milliliters of the prepared solution on top of the dolomite cake and drawing a slight vacuum through the filter cake. Any excess solution which remains on top of the dolomite cake after 30 minutes is carefully poured off and measured prior to treatment with the next solution. Subsequently the rubber stopper and wire screen are removed from the glass tube and, if the dolomite cake does not fall out the glass tube, the tube and cake are immersed in a beaker of water. After several minutes, the dolomite cake is qualitatively judged for consolidation and rated as follows:

CONSOLIDATION INDEX

0 — Cake falls out of the tube prior to immersion in water.
1 — Cake remains in tube but has a mush consistency.
2 — Cake has a hard top or bottom surface but the other surface is soft.
3 — Cake has a hard top or bottom surface with the other surface being semi-hard.
4 — Cake has a hard top and bottom but had a small quantity of loose pieces on the top.
5 — Cake is solid and hard. Based on this test, the combinations of reactant solutions selected should have a Consolidation Index of at least 3 and preferably should have a Consolidation Index of 4 or 5.

The invention is further illustrated by the following examples which are illustrative of specific modes of practicing the invention and are not intended as limiting the scope of the invention as defined by the appended claims.

EXAMPLES 1-9

The suitability of various conbinations of reactant solutions for use in the method of this invention is determined by the Dolomite Consolidation Procedure described above. Solution I of Examples 1-6 lack one or more of the essential ingredients of the solutions of this invention and are run for comparison with Examples 7-9 which are within the scope of this invention.

The compositions of the various solutions and their corresponding Consolidation Index are presented in Table 1. The compositions of Examples 7-9 which are within the scope of this invention have Consolidation Indices of 3 or above. And the compositions of Examples 1-6, which are outside the scope of this invention, have Consolidation Indices less than 3 and are not suitable for the purposes of this invention.

dolomite cake is contacted with the reactant solutions per the Dolomite Consolidation Procedure.

The compositions of the various aqueous drilling fluids and solutions I, II and III, and the corresponding Consolidation Indices, are presented in Table 2. The drilling fluids of Examples 10-14 are suitable for the method of this invention. However, the drilling fluids of Examples 15 and 16 are clearly unacceptable since they reduce the permeability of the dolomite to the subsequently injected reactant solutions.

TABLE 2

| Example No. | 10 | 11 | 12 | 13 | 14 | 15 | 16 |
|---|---|---|---|---|---|---|---|
| Drilling Fluid | | | | | | | |
| Polymer | — | Super-X | Ben-EX | Natrasol HR250 | CYPAN | XC-AL | SC-Polymer |
| lb/Bbl | | 1 | 0.5 | 1.5 | 2 | 1 | 1 |
| Sluggit, lb/Bbl | 10 | 10 | 10 | 10 | 10 | 10 | 10 |
| ml/16 hr. | 130 | 26 | 230 | 42 | 50 | 31 | 30 |
| Solution I | | | | | | | |
| ml/30 min | 6 | 13 | 40 | 40 | 40 | <1 | <1 |
| $CaCl_2$ | 5% | 5% | 5% | 5% | 5% | 5% | 5% |
| HCl | 2% | 2% | 2% | 2% | 2% | 2% | 2% |
| Surfactant | 0.25% | 0.2% | 0.2% | 0.25% | 0.25% | 0.25% | 0.25% |
| type | HAI-75 | HAI-75 | HAI-75 | HAI-75 | HAI-75 | HAI-75 | HAI-75 |
| Solution II | | | | | | | |
| ml/30 min | 9 | 5 | 11 | 10 | 22 | 3 | 3 |
| 18.5% sodium silicate | | | | | | | |
| Solution III | | | | | | | |
| ml/30 min | 4 | <1 | 1 | 1 | 2 | <1 | 2 |
| 5% $CaCl_2$ | | | | | | | |
| Consolidation Index | 4 | 4 | 5 | 5 | 4 | 0 | 0 |

XC-AL is a highly crosslinked heteropolysaccharide marketed by Xanco Oil Field Products
XC-polymer is a high molecular weight heteropolysaccharide marketed by Xanco Oil Field Products While particular embodiments of the invention have been described, it will be understood, of course, that the invention is not limited thereto since many obvious modifications can be made, and it is intended to include within this invention any such modification as will fall within the scope of the appended claims.

Having now described the invention, we claim:

TABLE 1

| Example No. | 1 | 2 | 3 | 4 | 5 | 6 | 7 | 8 | 9 |
|---|---|---|---|---|---|---|---|---|---|
| Solution I | | | | | | | | | |
| ml/30 min | 40 | 33.5 | 40 | 40 | 8 | 23 | 11 | 40 | 40 |
| $CaCl_2$ | 5% | 5% | 5% | 5% | 5% | — | 5% | 5% | 5% |
| HCl | — | — | — | — | — | 2% | 2% | 2% | 2% |
| Surfactant -type | — | 0.1% Ethomeen C/15 | — | 0.1% Ethomeen C/15 | 0.2% Sarkosyl LC | 0.1% Ethomeen C/15 | 0.2% Ethomeen C/15 | 0.2% Sarkosyl LC | 0.2% Tween 20 |
| Solution II | | | | | | | | | |
| ml/30 min | 6 | 4 | 12 | 8.5 | 7 | 13 | 10 | 16 | 22 |
| sodium silicate | 37% | 37% | 18.5% | 18.5% | 18.5% | 18.5% | 18.5% | 18.5% | 18.5% |
| Solution III | | | | | | | | | |
| ml/30 min 5% $CaCl_2$ | <1 | 6 | 2 | 1 | 10 | 9 | 8 | 3 | 3 |
| Consolidation Index | 1 | 2 | 2 | 2 | 2 | 0 | 5 | 5 | 4 |

Examples 10-16

Similarly, the suitability of various aqueous drilling fluids for use in the method of this invention is determined by a modification of the Dolomite Consolidation Procedure. After the dolomite cake is saturated with the 3 weight percent sodium chloride solution, a 100 milliliter column of drilling fluid is poured onto the top of the dolomite cake and a vacuum is drawn on the bottom of the cake for 16 hours. If the drilling fluid drains quickly, another measured quantity of drilling fluid is added. At the end of 16 hours, any excess drilling fluid is carefully poured off and measured. Then the 1. In a method for drilling a bore hole through a subterranean formation containing one or more zones of unconsolidated dolomite, the improvement which comprises the steps of:
   (a) drilling a distance through said subterranean formation, thereby exposing a newly drilled portion of said formation;
   (b) interrupting said drilling;
   (c) introducing into said bore hole a sequence of discrete reactant slugs of substantially oil-free solutions comprised of (I) an aqueous solution containing a water-soluble acid, a water-soluble surface active agent and a first water-soluble precipitating agent for silicates; (II) an aqueous solution containing a water-soluble silicate; and (III) an aqueous solution containing a second water-soluble precipitating agent for silicates;

(d) displacing each of said reactant slugs from said bore hole and into said newly drilled portion of said formation, wherein said reactant slugs become mixed;

(e) allowing said reactant slugs to react in said newly drilled portion of the formation, thereby forming a substantially impermeable, consolidated annular sheath about said bore hole; and (f) resuming said drilling.

2. The method defined in claim 1 wherein said bore hole is drilled through said formation in a plurality of increments, each of said increments being drilled and consolidated by said steps (a) through (f).

3. The method defined in claim 1 wherein said zones containing unconsolidated dolomite are hydrothermally leached zones which are substantially free of quartz sand and clay.

4. The method defined in claim 1 wherein said first and second precipitating agents for silicate are water-soluble salts of multivalent cations which react with silicate to form a silicate gel.

5. The method defined in claim 1 wherein said first and second precipitating agents are selected from the group consisting of calcium chloride and iron chloride.

6. The method defined in claim 1 wherein said surface active agent is selected from the group consisting of surface active amines, alkyl sarcosines, n-alkyl trimethyl ammonium chlorides, sorbitan monolaurates, and mixtures thereof.

7. The method defined in claim 1 wherein said surface active agent is a corrosion inhibiting composition.

8. The method defined in claim 1 wherein said water-soluble acid is selected from the group consisting of organic and inorganic acids which form water-soluble salts with said first precipitating agent.

9. The method defined in claim 1 wherein said water-soluble acid is selected from the group consisting of hydrochloric, hydrofluoric, acetic and citric acids.

10. The method defined in claim 1 wherein a drilling fluid is circulated through said bore hole during the drilling step and wherein said reactant slugs are separated from each other and from said drilling fluid by slugs of an inert spacer liquid.

11. The method defined in claim 10 wherein said drilling fluid is circulated downwardly through a drill string disposed in said bore hole and upwardly through the annular space between said drill string and the walls of said bore hole, and wherein each of said reactant slugs are individually introduced into said bore hole and displaced into said newly drilled portion of said formation by the consecutive steps comprised of flowing said reactant slug downwardly through said drill string as said drill string is raised to a predetermined position, thereby forming a body of said reactant slug in the bottom of said bore hole; temporarily sealing said annular space; injecting a fluid spacer into said drill string while said drill string is maintained in said predetermined position, thereby displacing at least a portion of said reactant slug into said newly drilled portion of said formation; opening said annular space; lowering said drill string to a point near the bottom of said bore hole; and circulating a fluid spacer downwardly through said drill string to displace the remainder of said reactant slug upwardly through said annular space.

12. The method defined in claim 1 wherein said solutions I, II, and III are selected such that their Consolidation Index is at least 3.

13. In a method for drilling a bore hole through a subterranean formation containing one or more hydrothermally leached zones of unconsolidated dolomite overlying a geothermal reservoir, wherein a substantially oil- and clay-free drilling fluid is passed through the bore-hole during the drilling operation, the improvement comprising the steps of:

(a) drilling a short distance through said subterranean formation, thereby exposing a newly drilled portion of the formation;

(b) interrupting said drilling operation;

(c) introducing into said bore hole a sequence of discrete reactant slugs of substantially oil-free solutions comprised of (I) an aqueous solution containing from 1 to 10 weight percent of a water-soluble acid selected from the group consisting of hydrochloric acid, hydrofluoric acid, acetic acid and citric acid, from 0.05 to 3 weight percent of a surface active agent selected from the group consisting of surface active amines, alkyl sarcosines, n-alkyl trimethyl ammonium chlorides, sorbitan monolaurates and mixtures thereof, and from 2 to 10 weight percent of a first precipitating agent selected from the group consisting of water-soluble multivalent cation salts of hydrochloric acid, hydrofluoric acid, acetic acid and citric acid; (II) an aqueous solution containing from 5 to 40 percent of a water-soluble, inorganic silicate selected from the group consisting of alkali metal and ammonium silicates; and (III) an aqueous solution containing from 2 to 10 weight percent of a second precipitating agent selected from the group consisting of the water-soluble multivalent cation salts of hydrochloric acid, hydrofluoric acid, acetic acid and citric acid, said sequence of said reactant slugs having a Consolidation Index of at least 4, and each of said reactant slugs being separated from each other and from said drilling fluid by slugs of an inert spacer liquid;

(d) sequentially displacing each of said reactant slugs from said bore hole into said newly drilled portion of the formation, wherein said slugs become mixed;

(e) allowing said reactant slugs to react in said newly drilled portion of the formation thereby forming a substantially impermeable, consolidated annular sheath about said bore hole; and (f) repeating said steps a) through e).

14. The method defined in claim 13 wherein said short distance comprises between about 20 to about 100 feet.

15. The method defined in claim 13 wherein said first and second precipitating agents are selected from the group consisting of iron chloride and calcium chloride.

16. The method defined in claim 13 wherein said surface active agent is a corrosion inhibiting composition.

17. The method defined in claim 13 wherein said solution I comprises an aqueous solution containing about 5 weight percent calcium chloride, about 2 weight percent hydrochloric acid and between about 0.1 and 0.5 weight percent of an ethylene oxide condensation product of the primary fatty amines.

18. The method defined in claim 13 wherein said drilling fluid is circulated downwardly through a drill string disposed in said bore hole and upwardly through the annular space between said drill string and the walls of said bore hole, and wherein each of said reactant slugs are individually introduced into said bore hole and displaced into said newly drilled portion of said formation by the consecutive steps comprised of flowing said reactant slug downwardly through said drill string as said drill string is raised to a predetermined position, thereby forming a body of said reactant slug in the bottom of said bore hole; temporarily sealing said annular space; injecting a fluid spacer into said drill string while said drill string is maintained in said predetermined position, thereby displacing at least a portion of said reactant slug into said newly drilled portion of said formation; opening said annular space; lowering said drill string to a point near the bottom of said bore hole; and circulating a fluid spacer downwardly through said drill string to displace the remainder of said reactant slug upwardly through said annular space.

* * * * *